Oct. 15, 1963     H. W. BOOK ETAL     3,106,842
THERMALLY RESPONSIVE DEVICE FOR ELECTRICAL APPARATUS
Filed June 5, 1959
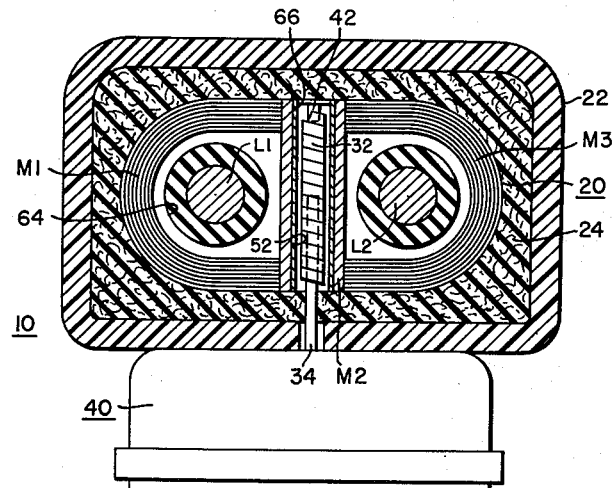
Fig.1.
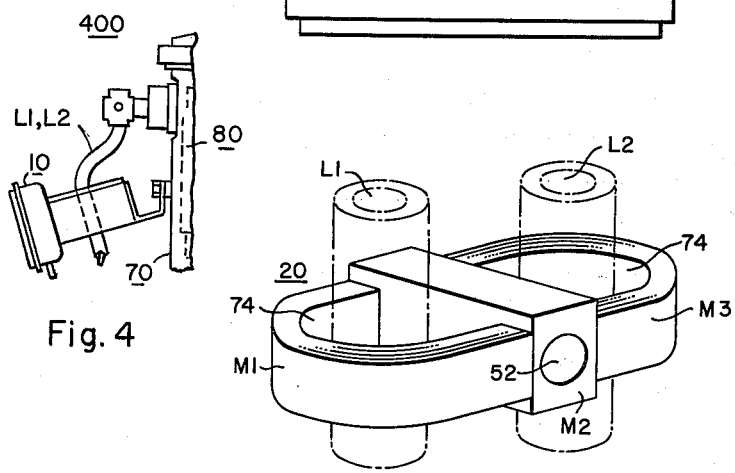
Fig. 4
Fig.2.
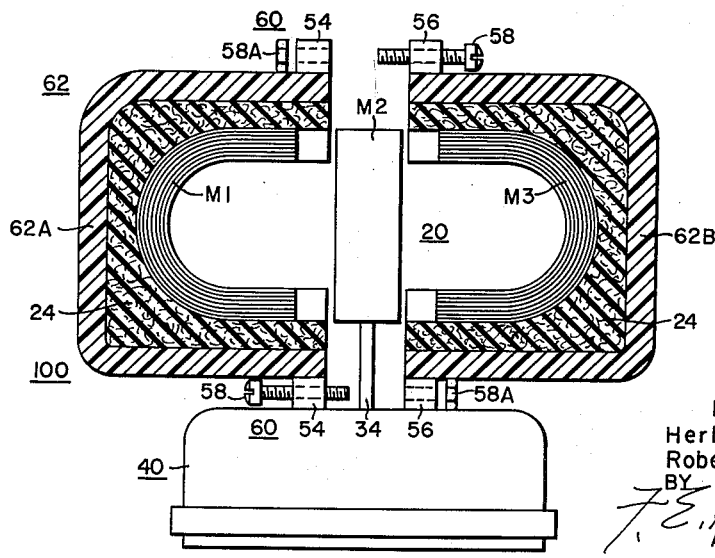
Fig.3.
INVENTORS
Herbert W. Book &
Robert E. Rood
BY
ATTORNEY

United States Patent Office 3,106,842
Patented Oct. 15, 1963

3,106,842
THERMALLY RESPONSIVE DEVICE FOR
ELECTRICAL APPARATUS
Herbert W. Book, Sharon, Pa., and Robert E. Rood, New Orleans, La., assignors to Westinghouse Electric Corporation, East Pittsburgh, Pa., a corporation of Pennsylvania
Filed June 5, 1959, Ser. No. 818,452
5 Claims. (Cl. 73—343)

This invention relates to thermal load or temperature indicators for electrical apparatus, such as transformers, and more particularly to thermally responsive devices employed in such indicators.

In certain types of conventional electrical apparatus, such as transformers, it has been the common practice in building certain types of such apparatus to bury thermostats, thermocouples and other thermally responsive devices in the windings or coils of such apparatus, the temperature or thermal load condition of which it is desired to measure or indicate. If such thermal indicating equipment should require repair or adjustment it may be necessary to tear down the windings or other parts of such apparatus. The latter procedure may also be necessary to add thermal indicating or sensing equipment to existing electrical apparatus.

In our copending applications, Serial Nos. 793,026 and 793,027, filed February 13, 1959, now Patent Nos. respectively 3,077,776 and 3,077,777, and assigned to the same assignee as the present application, there are disclosed several improved thermal or temperature indicators which do not require thermally responsive parts or devices to be built into the windings or coils of the associated electrical apparatus and which are particularly adapted for installation external to or on the outside of the casing or housing of electrical apparatus of the enclosed type. While the thermal indicators disclosed in said copending applications are suitable for most applications, there are certain applications where it is desirable to provide an indicator which is particularly adapted for use with associated electrical apparatus such as transformers, having lower ratings or which is particularly adapted for mounting on associated electrical apparatus without disturbing or disconnecting the external leads of such apparatus. It is, therefore, desirable to provide a thermal load or temperature indicator for electrical apparatus which has all of the advantages of the indicators disclosed in said copending applications and which has several additional advantages in certain applications.

It is an object of this invention to provide a new and improved thermal load indicator for electrical apparatus.

Another object of this invention is to provide a new and improved temperature indicator for electrical apparatus.

A further object of this invention is to provide a thermal indicator for electrical apparatus of the enclosed type which is particularly adapted for installation external to or on the outside of the casing of such apparatus and which is particularly adapted for use with such apparatus having lower ratings.

A still further object of the invention is to provide a thermal or temperature indicator for electrical apparatus of the enclosed type which is particularly adapted for installation external to or on the outside of the casing of such apparatus and which is particularly adapted for mounting on the associated apparatus without disturbing or disconnecting the external leads of such apparatus.

Other objects of the invention will in part be obvious and will in part appear hereinafter.

For a fuller understanding of the nature and objects of the invention, reference should be had to the following detailed description, taken in connection with the accompanying drawing in which:

FIGURE 1 is a top plan view partially in section of a thermal indicator illustrating a first embodiment of the invention;

FIG. 2 is a perspective view illustrating the magnetic member included in the indicator shown in FIG. 1;

FIG. 3 is a top plan view, partially in section, of a thermal indicator, illustrating a second embodiment of the invention; and FIG. 4 is a partial elevational view illustrating the mounting of the indicator shown in FIGS. 1 and 2 on the associated electrical apparatus.

Referring now to the drawing and FIGS. 1 and 2 in particular, there is shown in general a temperature or thermal load indicator 10 illustrating a first embodiment of the invention. The thermal indicator for electrical apparatus shown generally at 10 is a modification suitable for application to a distribution transformer 400 as shown in FIG. 4. The thermal indicator 10 is preferably mounted or disposed external to or on the outside of the casing or housing 70 of the associated electrical apparatus, such as the transformer 400, by suitable means, such as a conventional bracket member, as shown in greater detail in the copending applications previously mentioned, but it is to be understood that in certain applications, the thermal indicator 10 may be disposed inside the casing or tank 70 of the associated electrical apparatus. The electrical apparatus enclosed or disposed inside the casing or tank 70 of the associated apparatus may be a transformer core and coil assembly or winding assembly 80 to and from which electrical current is carried from outside of said casing by associated leads which may include one or more conductors, such as the conductors L1 and L2 having a covering of insulation thereon, as best shown in FIG. 2, in phantom. The conductors L1 and L2 may be connected to suitable terminal connectors of a conventional type which are mounted on the casing of the associated electrical apparatus and the electrical current carried by the conductors L1 and L2 may pass through said casing through suitable bushings of a conventional type.

The flow of electrical current to the associated electrical apparatus through one or more of the conductor leads L1 and L2 causes the temperature or thermal load condition of the electrical windings or coils inside the casing of the associated electrical apparatus to change or vary, the extent of such changes being measured or sensed and indicated by the thermal indicator 10. The thermal indicator 10, as illustrated, is particularly adapted for use with associated electrical apparatus, such as transformers, having lower ratings or having lower rated load currents associated therewith, for reasons which will be explained hereinafter. Since the thermal indicator 10 is disposed adjacent to the leads of the associated electrical apparatus, it is preferable that if the indicator 10 is employed with the transformer core and coil assembly 80, the indicator 10 should be disposed adjacent to the secondary or low voltage leads associated with said assembly in order to reduce the electrical insulation requirements in the construction of said indicator.

As mentioned previously, the thermal indicator 10 is preferably mounted or secured on the outside of the casing of the associated electrical apparatus by any suitable means, such as a conventional bracket member, which in turn is secured to said casing by a suitable means, such as a stud member or bolt arrangement.

Referring particularly to FIG. 1, the thermal indicator 10 comprises an indicating case or housing 40 and a base member 22 which may both be molded or cast from a suitable material, such as a silicone rubber or elastomer or a glass reinforced polyester molding material, that will have adequate strength and capacity to resist the weather when mounted outdoors. Since the indicator 10 may be associated with a transformer which is mounted on poles or in some location well above the ground level, the indicating case 40, the base member 22 and the associated bracket member may be arranged so that the indicating case 40 of the indicator 10 will be inclined at an angle to the horizontal to facilitate observation from the ground.

The thermal indicator 10 also includes means for sensing the temperature or thermal load condition of the windings or coils inside the casing of the associated electrical apparatus. The thermal sensing means comprises a magnetic member 20 which is mounted or disposed inside the base member or housing 22, as best shown in FIG. 1. Both the base member 22 and the magnetic member 20 include two openings or apertures 64 and 74, respectively, which permit one or more leads, such as the conductor leads L1 and L2, shown in FIGS. 1 and 2 to pass through said base member and said magnetic member.

As illustrated in FIG. 2, the magnetic member 20 comprises two generally C-shaped or U-shaped magnetic portions M1 and M3 and a center block or briding magnetic member or portion M2 having a generally cylindrical cavity or receptacle 52 therein. The center block member or portion M2 magnetically connects the ends of each of the C-shaped portions M1 and M3 to form a substantially closed magnetic loop around the leads L1 and L2, respectively. It is to be understood that in a particular application, a magnetic member, as disclosed, may include only a first magnetic portion similar to the magnetic portion M1 and a second magnetic portion similar to the magnetic portion M2 to form a substantially closed magnetic loop around only one of the leads L1 and L2.

The magnetic portions or sections M1 and M3 may be conveniently formed as a magnetic core of the type known to the art as a type "C" core, including a plurality of laminations having a coating of electrical insulation on at least one side to reduce eddy currents therein. The laminations of the magnetic sections M1 and M3 are preferably formed from a magnetic strip having a high permeability and a low loss characteristic, more specifically a low hysteresis loss coefficient, such as a silicon steel strip material having at least one preferred direction of orientation, such as the material sold under the trade name Hipersil. The center block member or portion M2 is preferably formed from a metallic magnetic material having a high loss characteristic, more specifically a high hysteresis loss coefficient. As explained in copending application Serial No. 694,116, filed by H. W. Book, now abandoned, and assigned to the same assignee as the present application for a magnetic member of a similar type, the center block member M2 may be molded from powdered metals or cast in one piece from a metallic material, such as steel, or formed in other suitable ways that are well known in the art and that will provide the features to be described hereinafter.

In order to reduce the overall reluctance of each of the substanitally closed magnetic loops formed around the leads L1 and L2 and to increase the effective heating of the center block member M2 due to the magnetic flux which travels in each of said magnetic loops, the major portion of each of said magnetic loops is preferably formed from the magnetic portions or sections M1 and M3 which, as already mentioned, are each formed from a magnetic material having a high permeability and low loss characteristic. The heating of the magnetic member 20 is also concentrated to a much greater degree in the center block member M2 for reasons which will be explained hereinafter because of the high loss characteristics of the magnetic material from which said center block member is formed. Since the effective heating of a magnetic material declines or is reduced when said material saturates, it is desirable that the center block member M2 be formed from a magnetic material which only saturates at a relatively high magnetic flux density, such as cast steel, and not one which saturates at a relatively low flux density, such as cast iron. The exact size, shape and thickness of the magnetic portions M1, M2 and M3 of the magnetic member 20 will depend to a large extent on the associated electrical apparatus with which it is to be employed. The selection of the magnetic materials from which the magnetic portions M1, M2 and M3 of the magnetic member 20 are formed may also depend upon the thermal insulation to be employed with said member and may be formed from any of the well-known magnetic materials, alloys or metallic oxides which are available and have the desired magnetic characteristics previously discussed.

As explained in the copending application last mentioned, whenever electrical current flows through the conductor leads L1 and L2 to the windings inside the casing of the associated electrical apparatus, a magnetic field will be set up adjacent to or around said conductor leads, which are best shown in phantom in FIG. 2. The density of the magnetic field set up around the conductor leads L1 and L2 will vary with the magnitude or amount of the current flowing in said leads. When a metallic magnetic member, such as the member 20 is disposed in a magnetic field around at least one of the conductor leads L1 and L2, many of the lines of magnetic flux in the space around said member will be concentrated in it to thereby heat up said member, the heating of said member being substantially concentrated in the center block member or portion M2, as previously discussed. As also previously mentioned, the amount of magnetic flux which travels in the substantially closed magnetic loops around the leads L1 and L2 is substantially increased by the presence of the magnetic portions M1 and M3 in each of said closed magnetic loops to thereby substantially increase the effective heating of the center block member M2 in response to a predetermined current flowing in either of the leads L1 or L2 or for a predetermined total current flowing in said leads.

The magnetic member 20 thus accumulates heat which varies with the density of the magnetic flux around at least one of the conductor leads L1 and L2 which, in turn, varies with electrical current flowing in said leads and in the windings inside the casing of the associated electrical apparatus. Since the temperature or thermal load condition of the electrical apparatus, which may include electrical windings or coils inside the casing of said apparatus, also varies with the current flowing in the leads L1 and L2, the temperature or thermal condition of the magnetic member 20 will vary as a function of the temperature or thermal condition of the associated electrical apparatus. In other words the magnetic member 20 may be suitably designed to provide a thermal "image" or reflection of electrical apparatus which is disposed inside the casing of said apparatus.

In order to control the heat transfer from magnetic member 20, the base member 22 is preferably formed from a thermally insulating material, which may also be an electrical insulating material to assist in insulating the magnetic member 20 from the conductor leads L1 and L2. The thermal insulation 24 may also be disposed around at least a portion of the magnetic member 20 to assist in control of the heat transfer from said member. The thermal insulation 24 may be provided in the form of polyester glass, wool or matting or as a cast member which assists in supporting the magnetic member 20. It is to be understood that, in certain applications, a portion of the base member 22 may be formed from thermally conducting material to more closely create a thermal image or reflection having similar thermal characteristics to the windings inside the casing or housing of the associated electrical apparatus. In other words by proper selection or design of the base member 22 and thermal insulation 24 as well as the magnetic member 20, the temperature or thermal condition of the magnetic member 20 may more closely correspond to the thermal operating characteristics, such as the thermal time constant, of the associated electrical apparatus.

In order to sense the temperature or thermal condition of the magnetic member 20 which is a function of the temperature of the associated electrical apparatus as previously mentioned, a thermally responsive device or means more specifically a helical bimetal 32, which may be of any conventional type, is disposed in the receptacle or recess 52 of the center block member M2. In order to improve the response of the bimetal 32 to the temperature or thermal condition of the magnetic member 20, the axes of the recess 52 and the bimetal 32 lie in substantially the same plane as the magnetic member 20 and said bimetal is preferably surrounded by the center block member M2 of said magnetic member. In order to provide a smooth surface for the receptacle or recess 52 in which the bimetal 32 may rotate as it deforms in response to or is actuated by the temperature of the magnetic member 20, a sleeve or tube member 66 is disposed inside the receptacle or cavity 52, as best shown in FIG. 1. The tube member 66 is preferably formed from a material having a high degree of thermal conductivity and preferably one of a non-corrosive type, such as copper or brass. One end of the helical bimetal 32 is secured to a post or projecting member 42 which is secured to or formed integrally with the inside of the base member 22, as best shown in FIG. 1. In order to indicate the temperature or thermal condition of the magnetic member 20, a rotatable shaft 34 is secured or attached to the other end of the helical bimetal 32 by suitable means, such as soldering or brazing.

As the electrical current which flows in the lead conductors L1 and L2 changes, the magnetic flux around said leads changes and the temperature of the magnetic member 20 changes also. The helical bimetal 32 responds to or is actuated by changes in the temperature of the magnetic member 20, more specifically the center block member or portion M2, to cause the rotatable shaft 34 to turn in one direction or the other depending upon the change in the temperature or thermal condition of the magnetic member 20. As disclosed in detail in copending applications Serial Nos. 793,026 and 793,027 previously mentioned, suitable indicating means may be provided in the indicating case 40 which is actuated by the rotation of the shaft 34 in response to the temperature or thermal condition of the helical bimetal 32 and the temperature or thermal condition of the magnetic member 20 in order to provide a visual indication of the temperature or thermal condition of said magnetic member and the corresponding temperature or thermal condition of the windings inside the casing of the associated electrical apparatus.

In summary, a magnetic member as disclosed increases the sensitivity of the thermal indicator 10 in response to predetermined load currents flowing in the conductor leads L1 and L2 since the heating of said magnetic member is substantially concentrated in the center block member or portion of said member and around the thermally responsive device or element which senses the temperature of said member. The thermal indicator 10 may, therefore, be employed or used with associated electrical apparatus having lower ratings and lower corresponding rated load currents flowing in the leads of said apparatus, which might otherwise be insufficient to heat or actuate a conventional thermal indicator of the general type disclosed. In other applications, the physical size of the magnetic member in a thermal indicator as disclosed may be reduced in order to provide a more compact over-all thermal indicator.

Referring now to FIG. 3, there is illustrated a thermal load indicator 100 which is similar to the thermal indicator 10 except that the thermal indicator 100 also includes means for assembling or mounting the thermal indicator 100 around the leads of the associated electrical apparatus without disturbing or disconnecting the leads of the associated electrical apparatus from the windings or coils of said apparatus.

In particular, the thermal indicator 100 comprises a base member 62, which is similar to the base member 22 of the thermal indicator 10 except that the base member 62 includes detachable mounting or positioning means, a magnetic member 20 and an indicating case 40, said magnetic member and said indicating case being identical to those of the indicator 10. The parts of the thermal indicator 100 which are identical to the equivalent parts of the thermal indicator 10 bear the same reference numerals.

The base member 62 of the thermal indicator 100 includes first and second base member portions 62A and 62B, in which are disposed the magnetic portions M1 and M3, respectively of the magnetic member 20 along with the associated thermally insulating material 24, as shown in FIG. 3. The base member 62 also includes detachable clamping or mounting means 60 at the back and front ends thereof, said mounting means including the lug or ear members 54 on the base member portion 62A, the lug or ear members 56 on the base member portion 62B and the bolt and nut means 58, 58A. It is assumed that the magnetic portion M2 of the magnetic member 20 is secured to or supported by the indicating case 40 to form a single assembly.

The various parts of the thermal indicator 100 are shown in a disassembled relationship in FIG. 3. The thermal indicator 100 may be mounted or assembled around the leads of the associated electrical apparatus without disturbing or disconnecting said means or threading said leads through the magnetic member 20 of the thermal indicator 100 by assembling said thermal indicator, as shown in FIG. 3, and then bringing the first and second base member portions 62A and 62B of said indicator together about the leads L1 and L2 with the adjacent ends of said base member portions substantially in contact and with the magnetic portions M1 and M3 of the magnetic member 20 substantially in contact with the center block member M2 of said magnetic member. The bolts 58 are then tightened by means of the associated nuts 58A and the base member 62, the indicating case 40 and the magnetic member 20 are then held in an assembled relationship about the leads L1 and L2 of the associated electrical apparatus. It is clear that in certain applications, the detachable fastening or clamping means 60 shown in FIG. 3 may be replaced by other suitable means, such as screws, bands, or interlocking or bayonet type arrangements.

The operation of the thermal indicator 100 after assembly about the leads of the associated electrical apparatus is the same as previously described for the thermal indicator 10.

It is to be noted that since the heating of a magnetic member in a thermal indicator as disclosed is due to both eddy current and hysteresis losses in said magnetic member that the heating of the center block member M2 in a magnetic member as disclosed is increased by forming said center block member from a non-laminated magnetic material while the heating of the generally C-shaped magnetic portions M1 and M3 is reduced by forming the latter magnetic portions from laminated magnetic material. It is to be understood, however, that although the magnetic portions M1 and M3 are preferably formed from laminated magnetic material that non-laminated magnetic material having a high permeability and low loss characteristic may be employed in certain applications for said magnetic portions. It should also be noted that a magnetic member in a thermal indicator disclosed is responsive to the sum of the currents which flow in the leads around which said magnetic member is disposed.

It is to be understood that the thermal indicator as disclosed may be employed as a thermal relay device to actuate associated indicating or signaling means or to actuate associated protective devices, such as circuit interrupters or circuit breakers, which would interrupt the current which flows in the leads of the associated electrical apparatus when the thermal condition of the windings of said apparatus reached a predetermined safe limit.

The apparatus embodying the teachings of this invention has several advantages. For example, the thermal load indicator or temperature indicator as disclosed may be readily mounted or installed on existing electrical apparatus of the enclosed type without opening the casing or housing of said apparatus. In addition, a thermal indicator as disclosed is particularly adapted for use with associated electrical apparatus having lower ratings or lower corresponding rated load currents. Further, a thermal indicator as disclosed is particularly adapted for mounting or assembling about the leads of the associated electrical apparatus without disturbing or disconnecting the leads of said apparatus or the connections of said leads to the windings of said apparatus. Finally, the thermal efficiency of the thermal indicator as disclosed is substantially increased by concentrating the heating of said indicator by the use of a magnetic member as disclosed.

Since numerous changes may be made in the above described apparatus and different embodiments of the invention may be made without departing from the spirit and scope thereof, it is intended all the matter contained in the foregoing description or shown in the accompanying drawing shall be interpreted as illustrative and not in a limiting sense.

We claim as our invention:

1. An electrical apparatus comprising an electrical winding, a housing containing said winding, leads through which electrical current is conducted to and from said winding, said electrical current causing the thermal condition of said winding to change, the flow of electrical current in said leads establishing a magnetic field about said leads, and means disposed externally of said housing for indicating the thermal condition of said winding inside said housing, said means comprising a base member, a magnetic member disposed inside the base member in the field surrounding at least one of said leads to heat up when current flows in the adjacent lead, the temperature of said magnetic member varying with the temperature of said winding, said magnetic member including a first portion composed of silicon steel material having a relatively high permeability and a low hysteresis loss coefficient and a second portion composed of a material which only saturates at a relatively high flux density and has a higher hysteresis loss coefficient than said first portion for concentrating the heating of said member in said second portion, said first and second portions being arranged to form a substantially closed magnetic loop, thermal insulating material disposed around the magnetic member inside the base member, and thermally responsive means disposed adjacent to said second portion to be responsive to the thermal condition of said second portion of said magnetic member for indicating the temperature of said winding.

2. A thermal load indicator for electrical apparatus having an electrical winding subject to heating when conducting electrical current and leads connected to said winding for conducting current to and from said winding, the current flow in said leads setting up a magnetic field around said leads, comprising a magnetic member disposed in said field which causes said member to heat up when current flows in said leads, an insulating base member for said magnetic member, the thermal condition of said magnetic member varying with that of said winding, said magnetic member comprising a first portion composed of silicon steel material having a low hysteresis loss coefficient and a second portion composed of a material which only saturates at a relatively high flux density and has a higher hysteresis loss coefficient than said first portion for concentrating the heating of said member in said second portion, thermal insulating material disposed around said magnetic member inside said base member, thermally responsive means disposed adjacent to said second portion to be responsive to the temperature of said member, and indicating means associated with the latter means to be actuated in response to the temperature of said winding.

3. An electrical apparatus comprising an electrical winding, a housing containing said winding, leads through which electrical current is conducted to and from said winding, said electrical current causing the thermal condition of said winding to change, the flow of electrical current in said leads establishing a magnetic field about said leads, and means disposed externally of said housing for indicating the thermal condition of said winding inside said housing, said means comprising a thermally insulating base member divided into two sections, a magnetic member disposed inside the base member in the field surrounding at least one of said leads to heat up when current flows in the adjacent lead, the temperature of said magnetic member varying with the temperature of said winding, said magnetic member including a first portion composed of silicon steel material having a relatively high permeability and a low hysteresis loss coefficient and a second portion composed of a material which only saturates at a relatively high flux density and has a higher hysteresis loss coefficient than said first portion for concentrating the heating of said member in said second portion, said first and second portions being arranged to form a substantially closed magnetic loop, thermally responsive means disposed adjacent to said second portion for indicating the temperature of said winding, and detachable clamping means for clamping the two base member sections and said first and second portions around at least one of said leads without disturbing said leads.

4. A transformer comprising an electrical winding, a housing containing said winding, leads through which electrical current is conducted to and from said winding, said electrical current causing the thermal condition of said winding to change, the flow of electrical current in said leads establishing a magnetic field about said leads, and means disposed externally of said housing for indicating the thermal condition of said winding inside said housing, said means comprising a base member divided into two sections, a magnetic member disposed inside the base member in the field surrounding at least one of said leads to heat up when current flows in the adjacent lead, the temperature of said magnetic member varying with the temperature of said winding, said magnetic member including a first portion composed of silicon steel material having a relatively high permeability and a low hysteresis loss coefficient and a second portion composed of a material which only saturates at a relatively high flux density and has a higher hysteresis loss coefficient than said first portion for concentrating the heating of said member in said second portion, said first and second portions being arranged to form a substantially closed magnetic loop around at least one of said leads, thermal insulating material surrounding said magnetic member inside the base member, thermally responsive means disposed adjacent to said second portion for indicating the temperature of said winding, and detachable mounting means for assembling the two sections of the base member and said first and second portions of said magnetic member around at least one of said leads without disconnecting said leads from said winding.

5. A thermal load indicator for electrical apparatus having an electrical winding subject to heating when conducting electrical current, and leads connected to said winding for conducting current to and from said winding, the current flow in said leads setting up a magnetic field around said leads, comprising a magnetic member disposed in said field which causes said member to heat up when current flows in said leads, a sectional base member for the magnetic member, the thermal condition of said magnetic member varying with that of said winding, said magnetic member comprising a first portion composed of silicon steel material having a low hysteresis loss coefficient and a second portion composed of a material which only saturates at a relatively high flux density and has a higher hysteresis loss coefficient than said first portion for concentrating the heating of said member in said second portion, said first and second portions being arranged to form a substantially closed magnetic loop, thermal insulating material surround the magnetic member inside the base member, thermally responsive means disposed adjacent to said second portion to be responsive to the temperature of said magnetic member, indicating means associated with the latter means to be actuated in response to the temperature of said winding, and detachable mounting means for assembling the sections of the base member and said first and second portions of said magnetic member around at least one of said leads without disconnecting said leads from said winding.

References Cited in the file of this patent

UNITED STATES PATENTS

| | | |
|---|---|---|
| 1,917,163 | Stephens et al. | July 4, 1933 |
| 1,953,914 | Camilli | Apr. 3, 1934 |
| 2,673,326 | Stauffer | Mar. 23, 1954 |
| 2,722,679 | Barr | Nov. 1, 1955 |

FOREIGN PATENTS

| | | |
|---|---|---|
| 329,986 | Great Britain | May 26, 1930 |
| 487,735 | Great Britain | Jan. 24, 1938 |